(12) United States Patent
Belden

(10) Patent No.: US 8,752,564 B1
(45) Date of Patent: Jun. 17, 2014

(54) SYSTEM FOR COVERING A CAMPER

(71) Applicant: Mark Belden, Ocklawaha, FL (US)

(72) Inventor: Mark Belden, Ocklawaha, FL (US)

( * ) Notice: Subject to any disclaimer, the term of this patent is extended or adjusted under 35 U.S.C. 154(b) by 0 days.

(21) Appl. No.: 13/685,954

(22) Filed: Nov. 27, 2012

Related U.S. Application Data

(63) Continuation-in-part of application No. 13/034,557, filed on Feb. 24, 2011, now Pat. No. 8,336,568.

(51) Int. Cl.
*E04H 15/06* (2006.01)
*E04H 6/04* (2006.01)

(52) U.S. Cl.
USPC ............... 135/88.06; 135/137; 135/153

(58) Field of Classification Search
CPC ............ E04H 15/06; E04H 15/48; E04H 6/04
USPC .................. 135/88.05, 88.06, 137, 148, 153
See application file for complete search history.

(56) References Cited

U.S. PATENT DOCUMENTS

| | | | |
|---|---|---|---|
| 2,798,501 A | 7/1957 | Oliver | |
| 2,856,942 A | 10/1958 | Scott | |
| 3,036,583 A | 5/1962 | Miller | |
| 4,228,622 A | 10/1980 | Tisma | |
| 4,605,030 A | 8/1986 | Johnson | |
| 4,834,128 A | 5/1989 | Burgess | |
| 4,886,083 A | 12/1989 | Gamache | |
| 4,991,363 A * | 2/1991 | Randmae | 52/2.11 |
| 5,076,174 A | 12/1991 | Martin | |
| 5,094,257 A | 3/1992 | Wilson et al. | |
| 5,241,977 A | 9/1993 | Flores et al. | |
| 5,501,502 A | 3/1996 | Wang | |
| 5,740,826 A | 4/1998 | Nevin et al. | |
| 5,941,593 A | 8/1999 | McCann | |
| 6,276,381 B1 | 8/2001 | O'Brien | |
| 7,546,844 B2 | 6/2009 | Al-Mutairi | |
| 7,604,016 B2 | 10/2009 | Songest | |
| 7,640,942 B2 | 1/2010 | Chu | |
| 2006/0054208 A1 | 3/2006 | Romano | |
| 2010/0037811 A1 | 2/2010 | Grant | |

* cited by examiner

*Primary Examiner* — Noah Chandler Hawk

(57) ABSTRACT

The present invention features a system for covering a camper including a base frame and a support frame. The base frame lies on the ground and is secured to a pair of wheels of the camper. A launch pole is used to lift the cover from one side of the camper. The support frame is slidably secured to the base frame and used to support the cover when the support frame is pulled toward to the other side of the camper. Two soft star wheels are attached to the support frame on each side to provide protection to the camper by preventing the support frame or the camper cover from scratching the camper surface.

14 Claims, 10 Drawing Sheets

FRONT VIEW

SIDE VIEW

LAUNCH POLE

STAR WHEEL

TOP VIEW

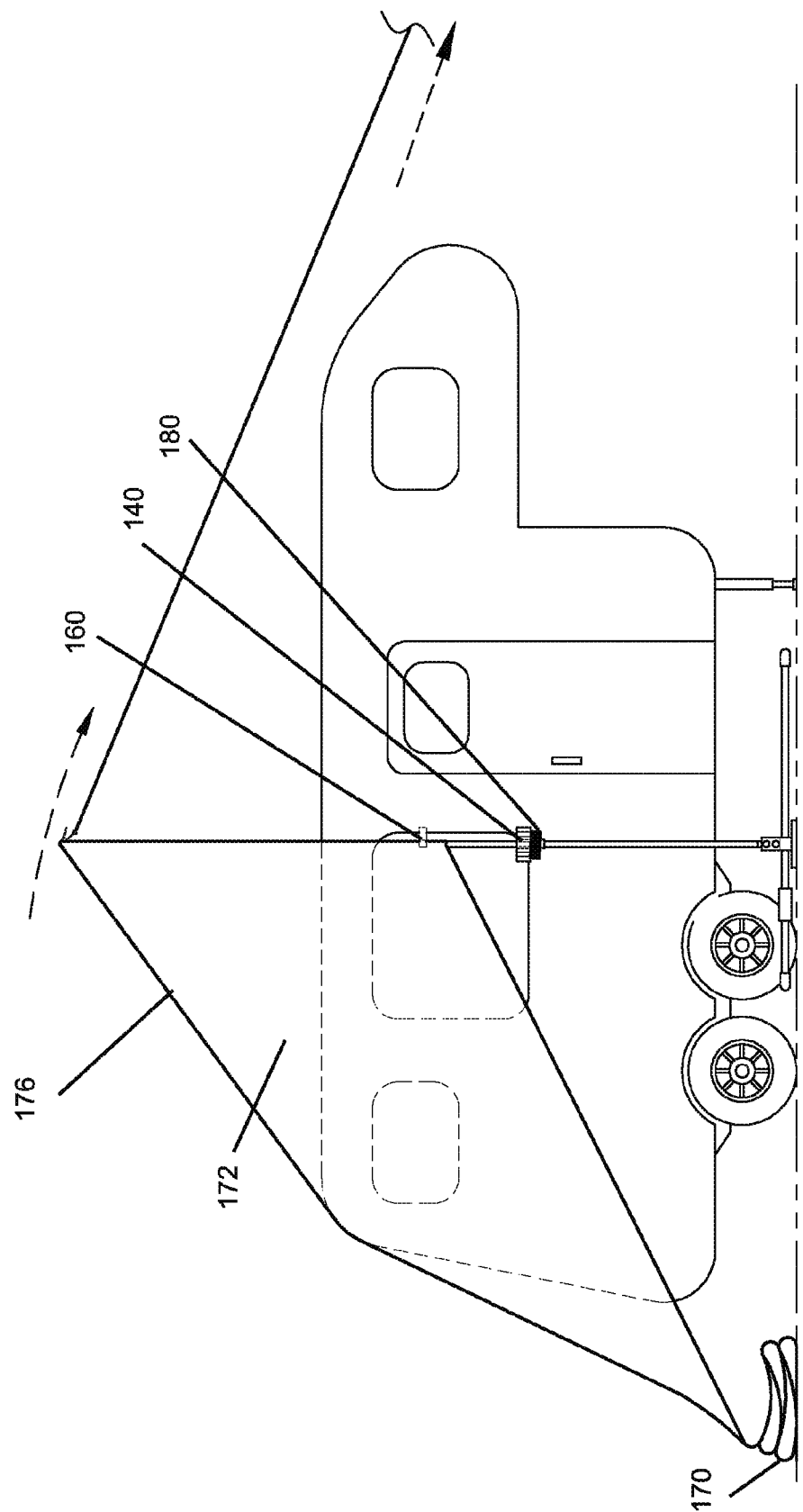

SYSTEM FOR COVERING A CAMPER

CROSS REFERENCE

This application claims priority to U.S. Non-Provisional application Ser. No. 13/034,557 filed Feb. 24, 2011, the disclosure of which is incorporated herein by reference in its entirety.

BACKGROUND OF THE INVENTION

A camper cover is heavy and it is generally difficult to drape the cover over a camper. The present invention features a camper system comprising swinging poles to facilitate the draping of a camper with a camper cover.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a system for covering a camper comprising a base frame and a support frame. The base frame lies on the ground and is secured to a pair of wheels of the camper. A launch pole is used to lift the cover from one side of the camper. The support frame is slidably secured to the base frame and used to support the cover when the support frame is pulled toward to the other side of the camper. Two star wheels are attached to the support frame on each side to provide protection to the camper by preventing the support frame or the camper cover from scratching the camper surface.

BRIEF DESCRIPTION OF THE DRAWINGS

FIG. 9A shows an opposite side view of the system wherein the camper cover is being pulled in the middle of the camper.

DESCRIPTION OF PREFERRED EMBODIMENTS

Figure 1:
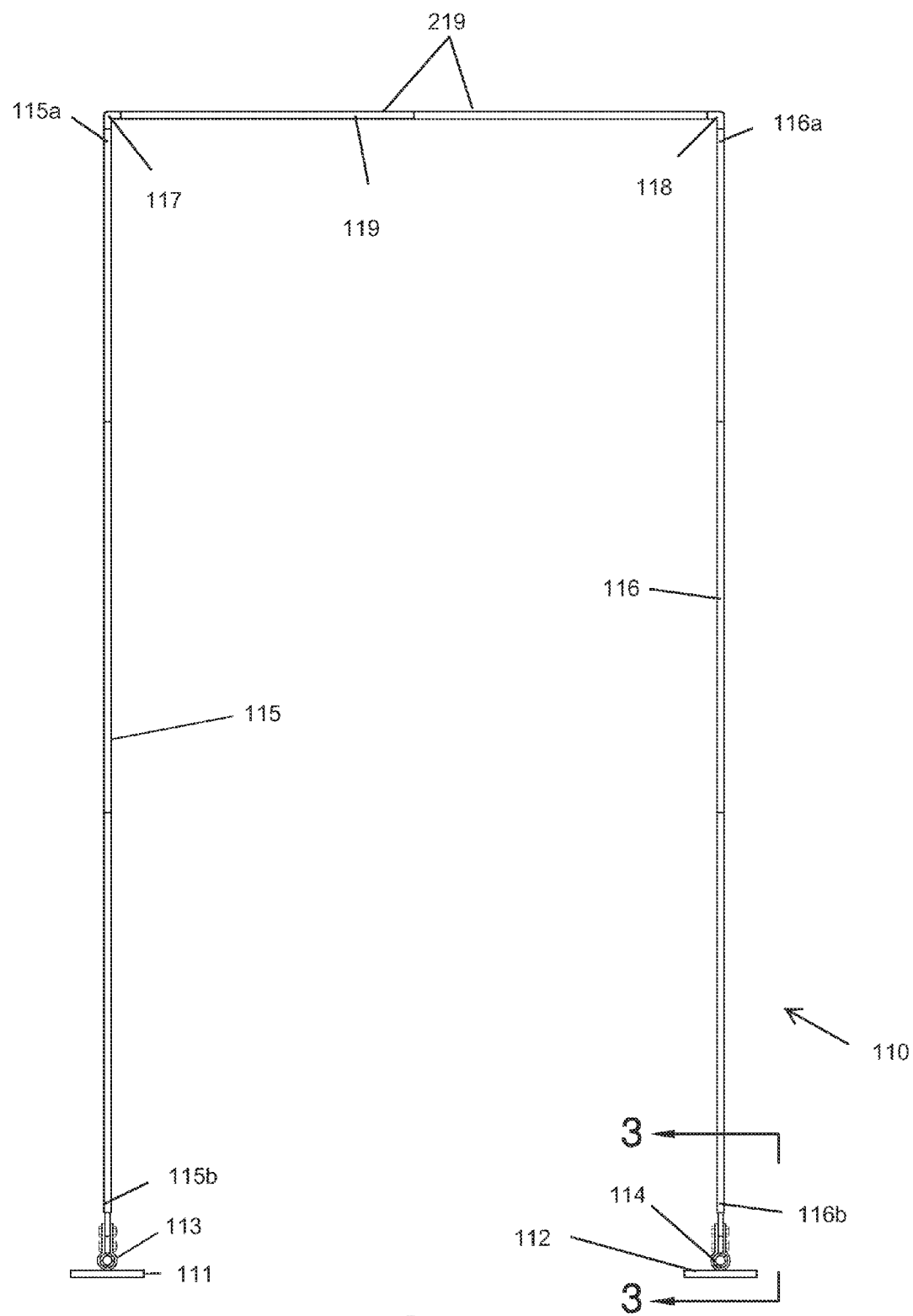
FIG. 1 shows a front view of the pole framework.
Figure 2:
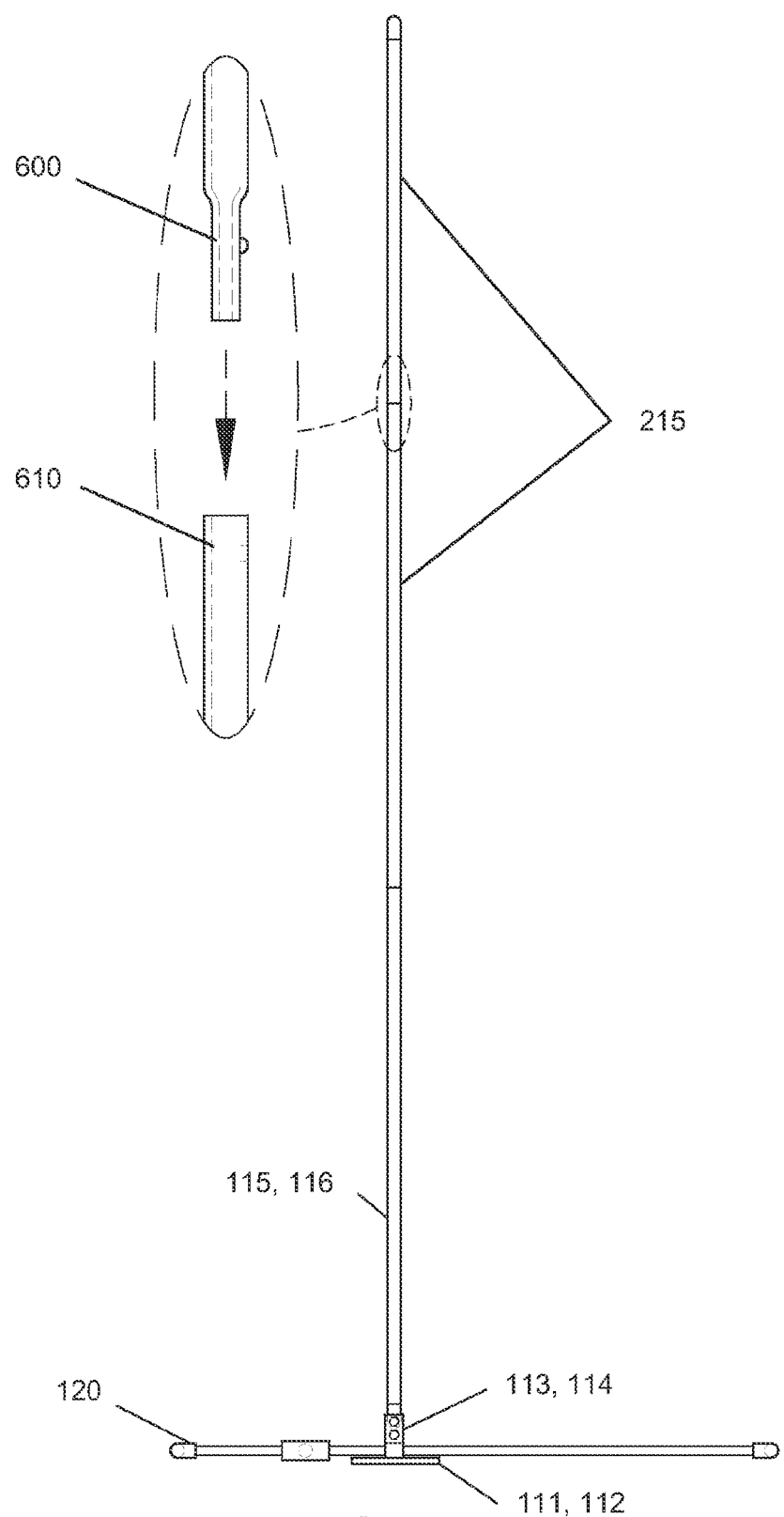
FIG. 2 shows a side view of the pole framework.
Figure 3:
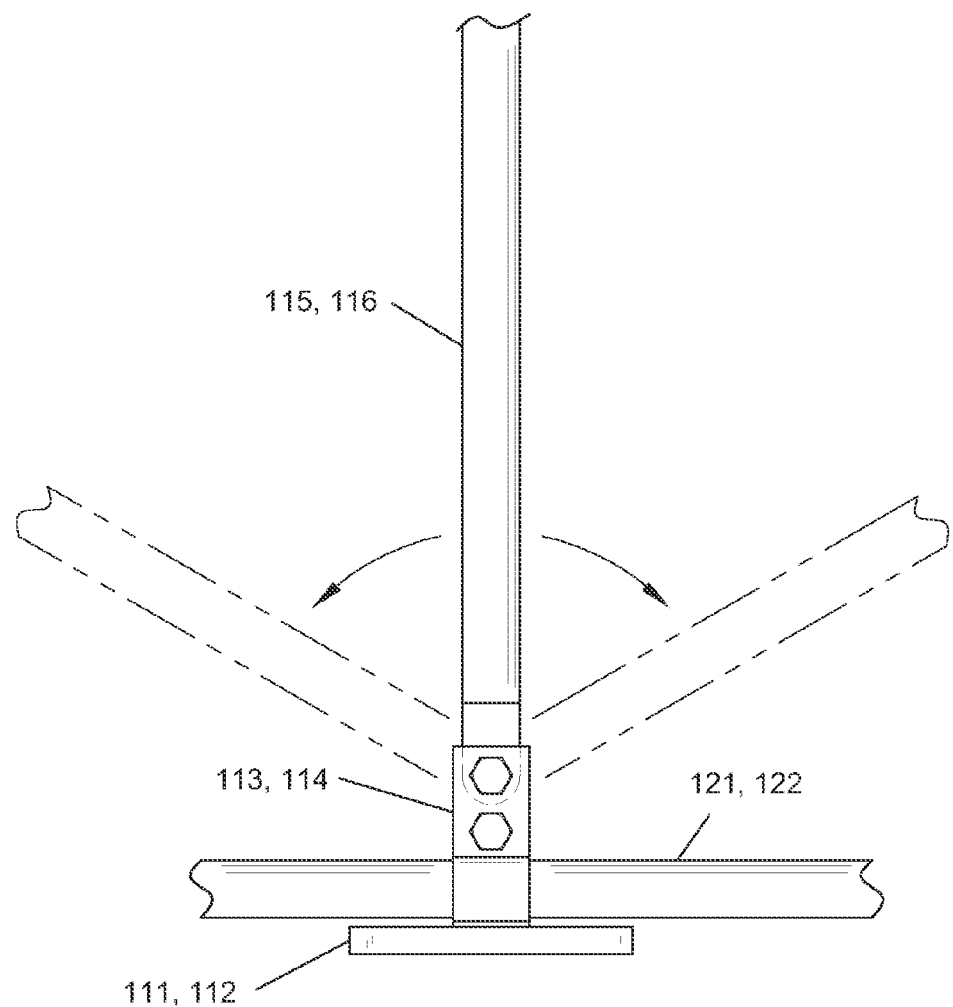
FIG. 3 shows a detailed view of the pole framework pivotably attached on a pivot plate.
Figures 4, 5:
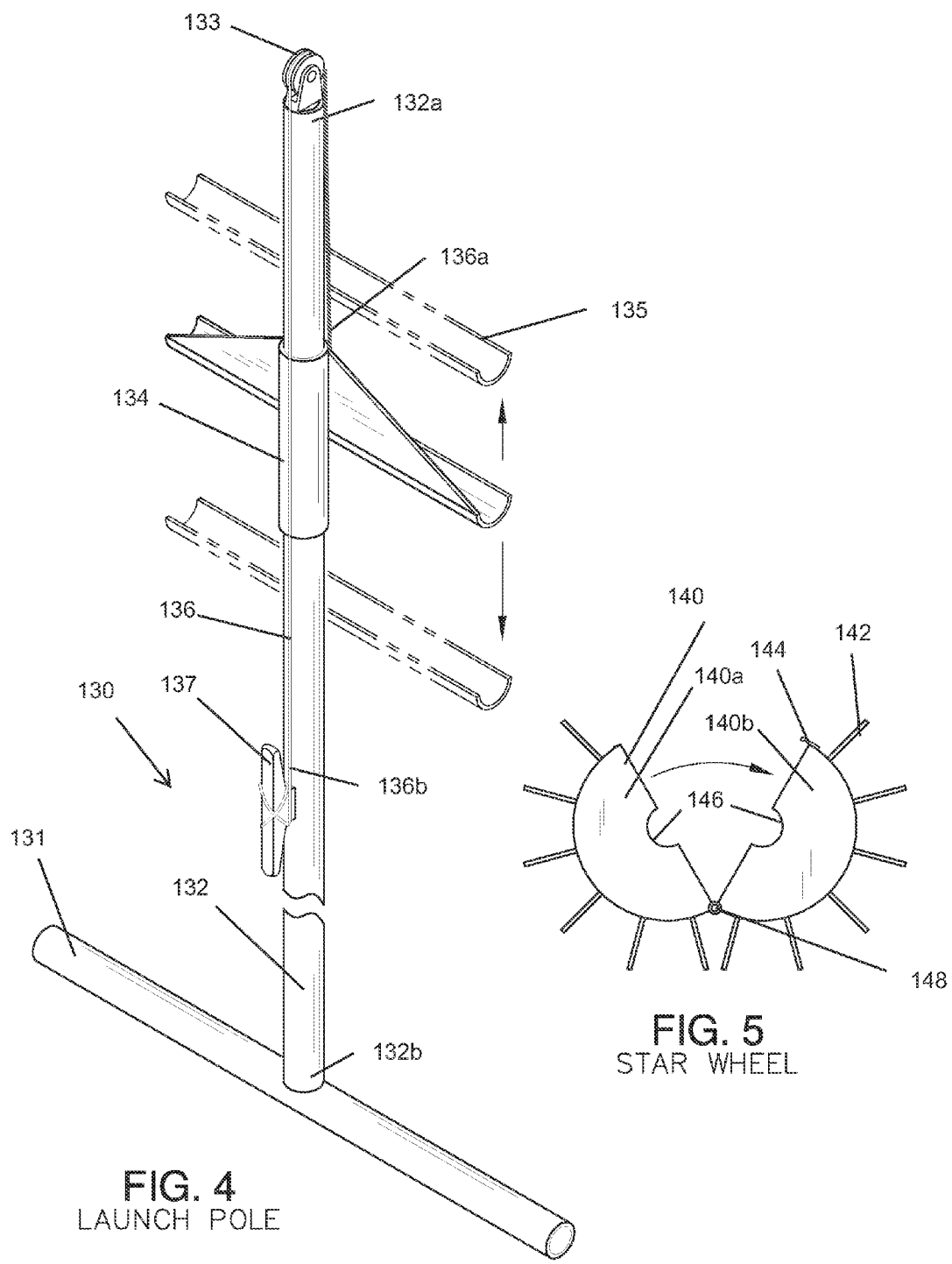
FIG. 4 shows an isometric view of a cover launch pole.
FIG. 5 shows a detailed view of a star wheel.
Figure 6:
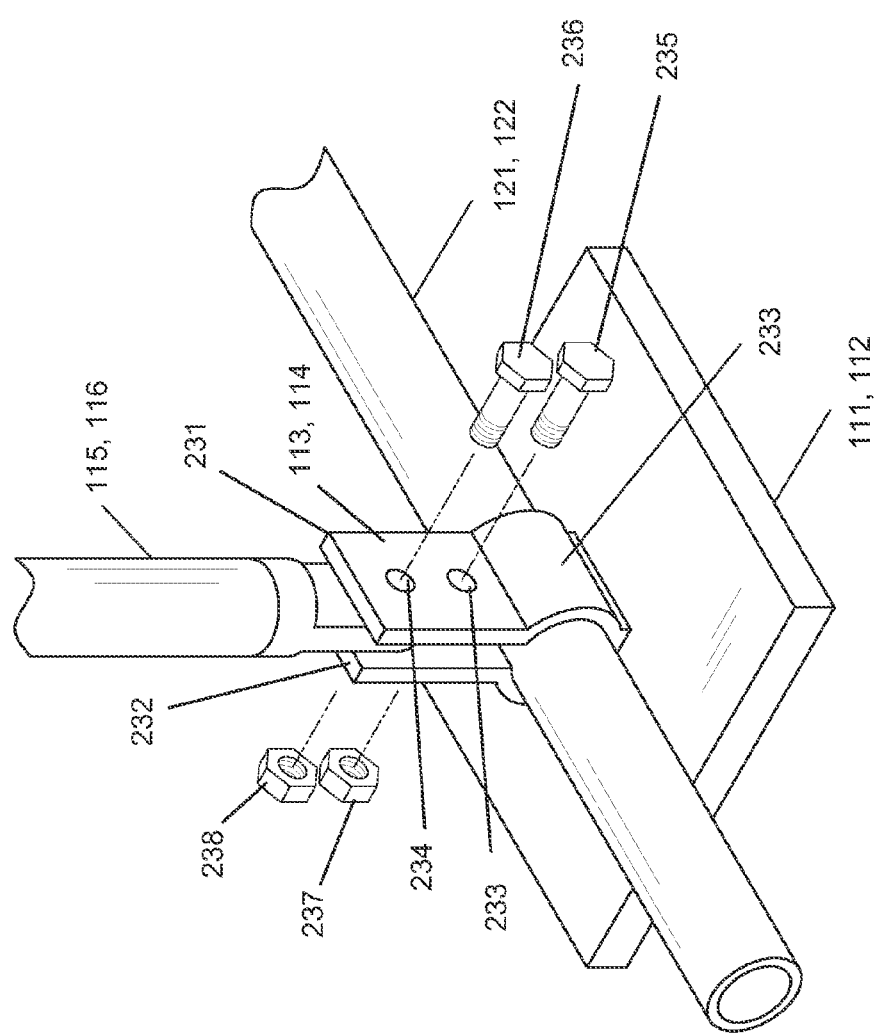
FIG. 6 shows an exploded view of a pole framework and base frame attached on a pivot plate.
Figure 7:
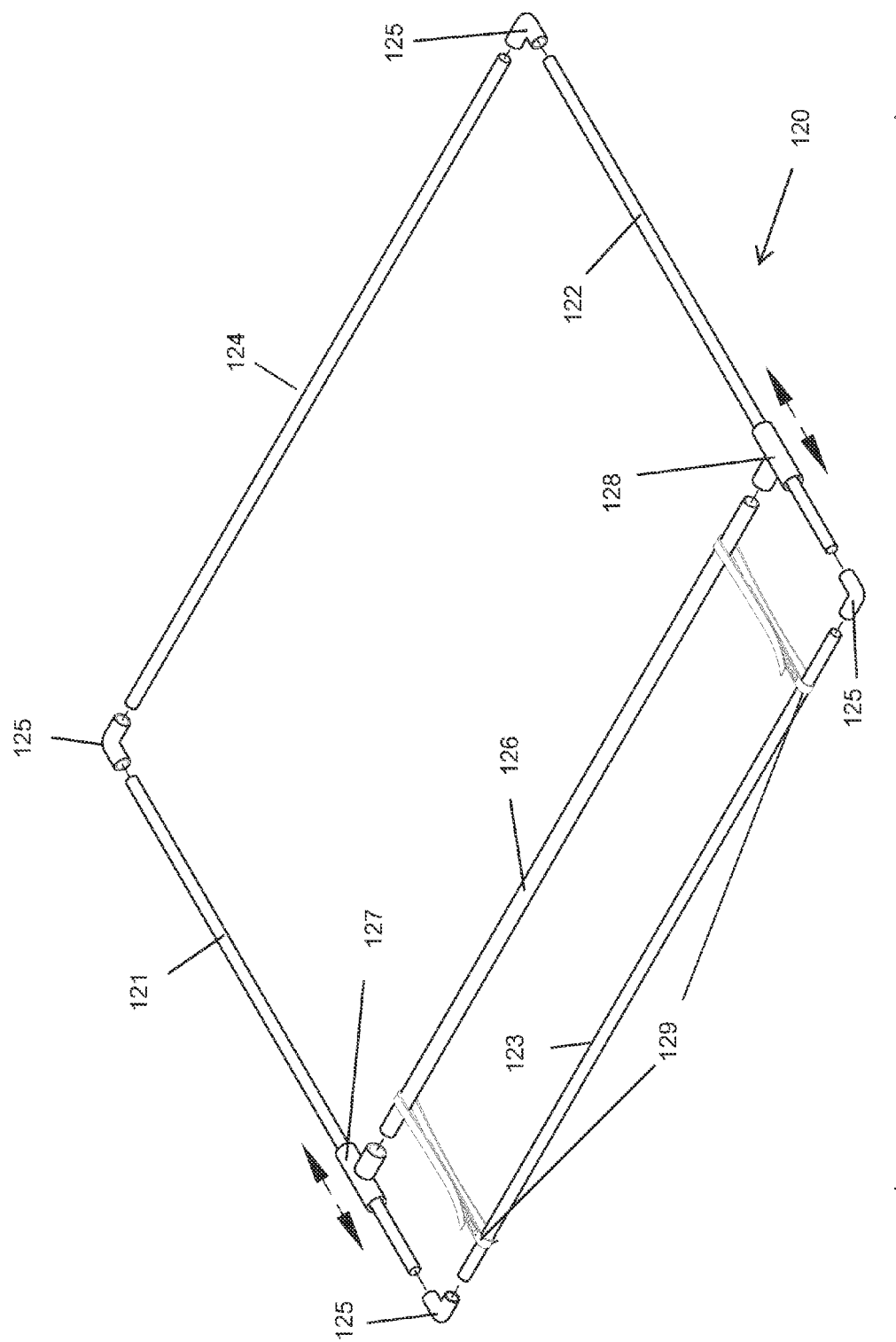
FIG. 7 shows an exploded view of a base frame.
Figure 8:
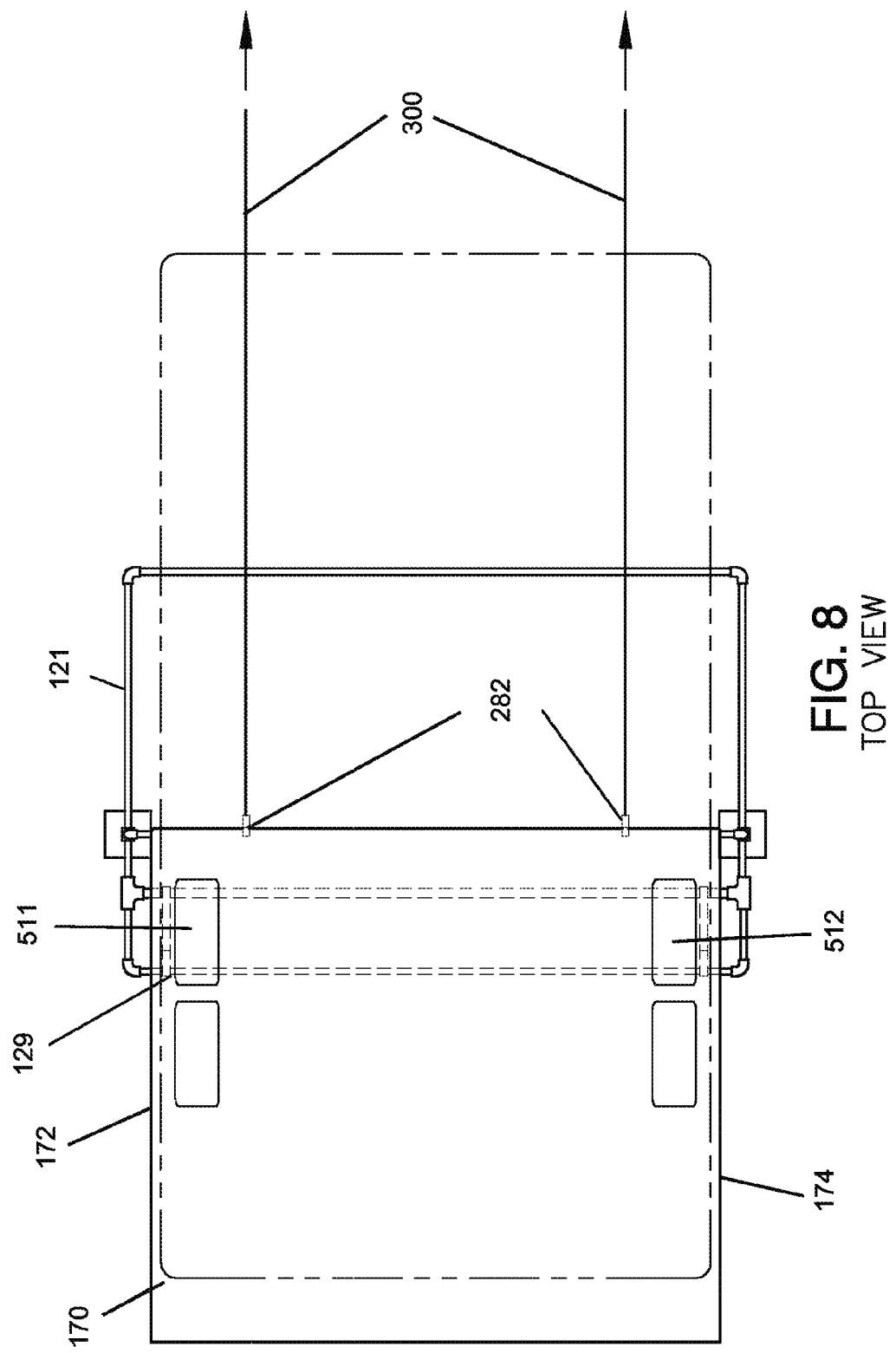
FIG. 8 shows a top view of the system wherein the camper cover is clamped to the pole framework and is pulled toward the second end of the camper.
Figure 9:
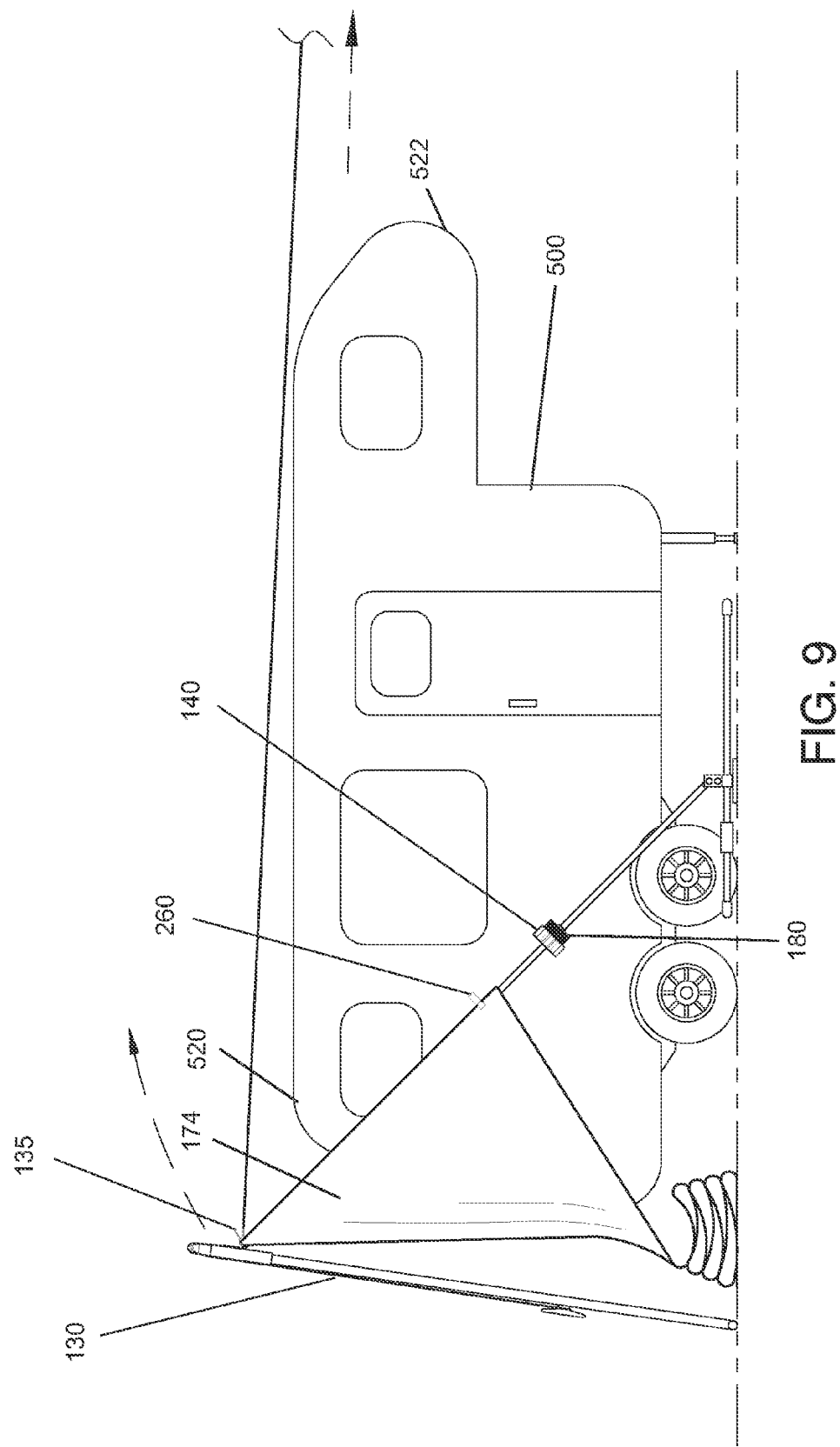
FIG. 9 shows a first side view of the system wherein the camper cover is raised by the launch pole and being supported by the pole framework, with the pole framework being pulled toward the second end of the camper.
Figure 9B:
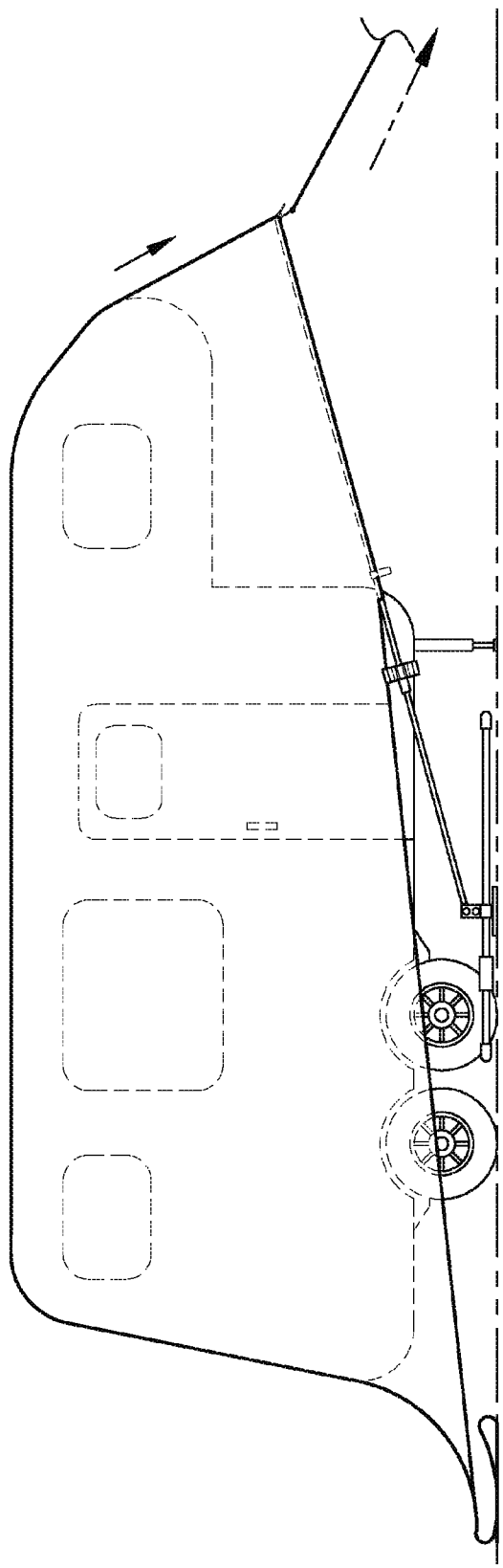
FIG. 9B shows a side view of the system wherein the camper cover is being pulled and the draping of the camper by the camper cover is about to cover the whole camper.

Referring now to FIG. 1-9B, the present invention features a system 100 for covering a camper 500 with a camper cover 170. The camper 500 is parked and has at least a first wheel (511) and a second wheel (512) on opposite sides of the camper. The camper cover (170) has a first side section (172), a second side section (174) and a top section (176). The system comprises a base frame (120) and a support frame (110).

The base frame (120) has a first base bar (121), a second base bar (122), a third base bar (123) and a fourth base bar (124), wherein the four base bars are jointed via four elbow fittings (125) to form a rectangle shape, wherein the base frame (120) further comprises a fifth base bar (126) attached to the first base bar (121) via a first sliding fitting (127) and to the second base bar (122) via a second sliding fitting (128), wherein the first sliding fitting (127) is slidable along the first base bar (121) and the second sliding fitting (128) is slidable along the second base bar (122), wherein the first wheel (511) and second wheel (512) sit between the third base bar (123) and the fifth base bar (126).

The support frame (110) comprises a first lift pole (115), a second lift pole (116) and a linking bar (119), wherein the first lift pole (115) has a first lift pole upper end (115a) and a first lift pole lower end (115b), wherein the second lift pole (116) has a second lift pole upper end (116a) and a second lift pole lower end (116b), wherein the linking bar (119) connects the upper end of the first lift pole (115) via a first linking fitting (117) and the upper end of the second lift pole (116) via a second linking fitting (118); wherein a first side clamp (160) disposed on the first lift pole (115) for clamping the first side section (172) of the camper cover (170) to the first lift pole (115); wherein a second side clamp (260) disposed on the second lift pole (116) for clamping the second side section (174) of the camper cover (170) to the second lift pole (116); wherein a top clamp (282) is disposed on the linking bar (119) for clamping a top section (176) of the camper cover (170) to the linking bar (119).

The system also comprises a first pivot bracket (113) and a second pivot bracket (114), wherein both the first pivot bracket (113) and the second pivot bracket (114) are a U-shaped bracket having a first arm (231), a second arm (232) and a middle arm (233) connecting the first arm (231) and the second arm (232), wherein the middle arm (233) is configured to snugly receive the first base bar (121) or the second base bar (122), wherein the first base bar (121) and the second base bar (122) are secured to the first pivot bracket (113) and the second pivot bracket (114) respectively via a first secure means, wherein the first lift pole (115) and the second lift pole (116) are pivotably attached to the first pivot bracket (113) and the second pivot bracket (114) respectively between the first arm (231) and the second arm (232) via a second secure means.

To cover the camper (500) with the camper cover (170), the camper (500) is parked with the first wheel (511) and second wheel (512) rested between the third base bar (123) and the fifth base bar (126), wherein the third base bar (123) and the fifth base bar (126) are removably and securely tied together via a third secure means such that the base frame (120) is securely attached to the camper (500), wherein the first side clamp (160), top clamp (282) and second side clamp (260) are used to clamp onto a camper cover (170) at the first side section (172), top section (176) and second side section (174) of the camper cover (170), respectively; when the first lift pole (115) and second lift pole (116) are angled toward a first end of the camper (520) of the camper, then the first lift pole (115) and second lift pole (116) are swung toward the second end (522) of the camper and causing the camper cover (170) to drape over the camper (500).

In some embodiments, the third arm of the first pivot bracket (113) is securely attached to a first pivot plate (111), wherein the third arm of the second pivot bracket (114) is securely attached to a second pivot plate (112).

In some embodiments, the first secure means is a screw means, wherein both the first arm (231) and the second arm (232) comprise a first apertures (233), wherein a first bolt (235) passes through the apertures (233) and is locked by a first nut (237) to securely tighten the grip of the first base bar (121) or the second base bar (122) within the third arm (233). In some embodiments, the second secure means is a screw means, wherein the first arm (231), the second arm (232) and the lower ends (115a, 115b) of the first lift pole and second pole comprise a second apertures (234), wherein a second bolt (236) passes through the apertures (234) and is locked by a second nut (238) to securely and pivotably hold the first lift pole (115) or the second lift pole (115) between the first arm (231) and the second arm (232). In some embodiments, the third secure means is a tie fastener means, such as a zip tie or a hook-and-loop fastener strap.

In some embodiments, the first lift pole (115) and the second lift pole (116) comprise multiple connecting sections (215). In some embodiments, the linking bar (119) comprises multiple connecting sections (219). In some embodiments, the connection sections are tubes comprising a male end and a female end, where a male end 600 of one section can be fitted with a female end 610 of another section to form a longer tube, see FIG. 2 insert for example.

In some embodiments, a rope (300) is attached to the linking bar (119) to swing the first lift pole (115) and the second lift pole (116) from the first end (520) of the camper toward the second end (522).

In some embodiments, a launching frame (130) is used to push and lift the linking bar (119) from the first end (520) of the camper toward the second end (522), wherein the launching frame (130) comprises a support component (131) and a launch pole (132) with a top end (132a) and a lower end (132b) attached on the support component (131), wherein a pulley (133) is attached on the top end (132a) of the launch pole (132), wherein a mounting handle (137) is attached on the launch pole (132), wherein a holding bar (135) is slidably attached to the launch pole (132), wherein a cable (136) is disposed to attach the holding bar (135) with a first cable end (136a), wrap through the pulley (133) and secured to the mounting handle (137) with a second cable end (136b), wherein the holding bar (135) is configured to removably lift the linking bar (119) to a desired height to drag the camper cover (170) to cover the camper (170). In some embodiments, the holding bar (135) is between 18 to 24 inches in length. In some embodiments, the holding bar (135) is between 24 to 48 inches in length.

In some embodiments, a star wheel (140) is disposed on both the first-lift pole (115) and the second lift pole (116), wherein the star wheel (140) is removably and rotatably attached to the first lift pole (115) and the second lift pole (116), wherein a plurality of soft protection arms (142) are attached on the star wheel (140), wherein the star wheel (140) is disposed such that when the first lift pole (115) and the second lift pole (116) are close the camper (500), the star wheel (500) rotates round the first lift pole (115) and the second lift pole (116) with the soft protection arms (142) touch the camper (500). The soft protection arms (142) can be made of soft materials, such as rubber or silicon rubber, to prevent the camper surface from scratching by the camper cover or support poles during the dragging process of the camper cover.

In some embodiments, the star wheel (140) comprises a first half (140a) and a second half (140b), wherein the halves are pivotably connected by a pivot joint (148) and removably locked together via a lock means, wherein the first half (140a) and a second half (140b) have a groove (146) configured to embrace the first support pole (115) or the second support pole (116).

In some embodiments, the star wheel (140) are supported by a holder (80) securely disposed on the first support pole (115) and the second support pole (116), wherein the holder (180) is configured to support the star wheel (140) from sliding downwards when the first support pole (115) and the second support pole (116) are pulled. In some embodiments, the holder (180) are securely attached to the support poles via a screw means, a clamp means, etc.

As used herein, the term "about" refers to plus or minus 10% of the referenced number. For example, a holding bar (135) with a length of 20 inches in length includes length between 18 inch and 22 inches.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A system (100) for covering a camper (500) with a camper cover (170), the system comprising:
   (a) a camper (500) having at least a first wheel (511) and a second wheel (512) on opposite sides of the camper;
   (b) a camper cover (170) having a first side section (172), a second side section (174) and a top section (176);
   (c) a base frame (120) having a first base bar (121), a second base bar (122), a third base bar (123) and a fourth base bar (124), wherein the four base bars are jointed via four elbow fittings (125) to form a rectangle shape, wherein the base frame (120) further comprises a fifth base bar (126) attached to the first base bar (121) via a first sliding fitting (127) and to the second base bar (122) via a second sliding fitting (128), wherein the first sliding fitting (127) is slidable along the first base bar (121) and the second sliding fitting (128) is slidable along the second base bar (122), wherein the first wheel (511) and second wheel (512) sit between the third base bar (123) and the fifth base bar (126);
   (d) a support frame (110) comprising a first lift pole (115), a second lift pole (116) and a linking bar (119), wherein the first lift pole (115) has a first lift pole upper end (115a) and a first lift pole lower end (115b), wherein the second lift pole (116) has a second lift pole upper end (116a) and a second lift pole lower end (116b), wherein the linking bar (119) connects the upper end of the first lift pole (115) via a first linking fitting (117) and the upper end of the second lift pole (116) via a second linking fitting (118); wherein a first side clamp (160) disposed on the first lift pole (115) for clamping the first side section (172) of the camper cover (170) to the first lift pole (115); wherein a second side clamp (260) disposed on the second lift pole (116) for clamping the second side section (174) of the camper cover (170) to the second lift pole (116); wherein a top clamp (282) is disposed on the linking bar (119) for clamping a top section (176) of the camper cover (170) to the linking bar (119);

(e) a first pivot bracket (113) and a second pivot bracket (114), wherein both the first pivot bracket (113) and the second pivot bracket (114) are a U-shaped bracket having a first arm (231), a second arm (232) and a middle arm (233) connecting the first arm (231) and the second arm (232), wherein the middle arm (233) is configured to snugly receive the first base bar (121) or the second base bar (122), wherein the first base bar (121) and the second base bar (122) are secured to the first pivot bracket (113) and the second pivot bracket (114) respectively via a first secure means, wherein the first lift pole (115) and the second lift pole (116) are pivotably attached to the first pivot bracket (113) and the second pivot bracket (114) respectively between the first arm (231) and the second arm (232) via a second secure means; and wherein to cover the camper (500) with the camper cover (170), the camper (500) is parked with the first wheel (511) and second wheel (512) rested between the third base bar (123) and the fifth base bar (126), wherein the third base bar (123) and the fifth base bar (126) are removably and securely tied together via a third secure means such that the base frame (120) is securely attached to the camper (500), wherein the first side clamp (160), top clamp (282) and second side clamp (260) are used to clamp onto a camper cover (170) at the first side section (172), top section (176) and second side section (174) of the camper cover (170), respectively; when the first lift pole (115) and second lift pole (116) are angled toward a first end of the camper (520) of the camper, then the first lift pole (115) and second lift pole (116) are swung toward the second end (522) of the camper and causing the camper cover (170) to drape over the camper (500).

2. The system of claim 1, wherein the third arm of the first pivot bracket (113) is securely attached to a first pivot plate (111), wherein the third arm of the second pivot bracket (114) is securely attached to a second pivot plate (112).

3. The system of claim 1, wherein the first secure means is a screw means, wherein both the first arm (231) and the second arm (232) comprise a first apertures (233), wherein a first bolt (235) passes through the apertures (233) and is locked by a first nut (237) to securely tighten the grip of the first base bar (121) or the second base bar (122) within the third arm (233).

4. The system of claim 1, wherein the second secure means is a screw means, wherein the first arm (231), the second arm (232) and the lower ends (115a, 115b) of the first lift pole and second pole comprise a second apertures (234), wherein a second bolt (236) passes through the apertures (234) and is locked by a second nut (238) to securely and pivotably hold the first lift pole (115) or the second lift pole (115) between the first arm (231) and the second arm (232).

5. The system of claim 1, wherein the third secure means is a tie fastener means, such as a zip tie or a hook-and-loop fastener strap.

6. The system of claim 1, wherein the first lift pole (115) comprises multiple connecting sections (215).

7. The system of claim 1, wherein the second lift pole (116) comprises multiple connecting sections (215).

8. The system of claim 1, wherein the linking bar (119) comprises multiple connecting sections (219).

9. The system of claim 1, wherein a rope (300) is attached to the linking bar (119) to swing the first lift pole (115) and the second lift pole (116) from the first end (520) of the camper toward the second end (522).

10. The system of claim 1, wherein a launching frame (130) is used to push and lift the linking bar (119) from the first end (520) of the camper toward the second end (522), wherein the launching frame (130) comprises a support component (131) and a launch pole (132) with a top end (132a) and a lower end (132b) attached on the support component (131), wherein a pulley (133) is attached on the top end (132a) of the launch pole (132), wherein a mounting handle (137) is attached on the launch pole (132), wherein a holding bar (135) is slidably attached to the launch pole (132), wherein a cable (136) is disposed to attach the holding bar (135) with a first cable end (136a), wrap through the pulley (133) and secured to the mounting handle (137) with a second cable end (136b), wherein the holding bar (135) is configured to removably lift the linking bar (119) to a desired height to drag the camper cover (170) to cover the camper (170).

11. The system of claim 1, wherein a star wheel (140) is disposed on both the first lift pole (115) and the second lift pole (116), wherein the star wheel (140) is removably and rotatably attached to the first lift pole (115) and the second lift pole (116), wherein a plurality of soft protection arms (142) are attached on the star wheel (140), wherein the star wheel (140) is disposed such that when the first lift pole (115) and the second lift pole (116) are close the camper (500), the star wheel (500) rotates round the first lift pole (115) and the second lift pole (116) with the soft protection arms (142) touch the camper (500).

12. The system of claim 11, wherein the soft protection arms (142) are made of soft materials, such as rubber or silicon rubber.

13. The system of claim 11, wherein the star wheel (140) comprises a first half (140a) and a second half (140b), wherein the halves are pivotably connected by a pivot joint (148) and removably locked together via a lock means, wherein the first half (140a) and a second half (140b) have a groove (146) configured to embrace the first support pole (115) or the second support pole (116).

14. The system of claim 11, wherein the star wheel (140) are supported by a holder (180) securely disposed on the first lift pole (115) and the second lift pole (116), wherein the holder (180) is configured to support the star wheel (140) from sliding downwards when the first lift pole (115) and the second lift pole (116) are pulled.

* * * * *